L. ILLMER, Jr. & E. J. KUNZE.
VALVE MECHANISM.
APPLICATION FILED JUNE 23, 1904. RENEWED MAY 3, 1907.

909,187.

Patented Jan. 12, 1909.

WITNESSES:
H. Walker
Isaac B. Owens.

INVENTORS
Louis Illmer Jr.
Edward J. Kunze
BY
Munn
ATTORNEYS

L. ILLMER, Jr. & E. J. KUNZE.
VALVE MECHANISM.
APPLICATION FILED JUNE 23, 1904. RENEWED MAY 3, 1907.

909,187. Patented Jan. 12, 1909.
3 SHEETS—SHEET 2.

WITNESSES:
H. Walker
Isaac B. Owens.

INVENTORS
Louis Illmer Jr.
Edward J. Kunze
BY

ATTORNEYS

L. ILLMER, Jr. & E. J. KUNZE.
VALVE MECHANISM.
APPLICATION FILED JUNE 23, 1904. RENEWED MAY 3, 1907.

909,187.

Patented Jan. 12, 1909.

WITNESSES:
H. Walker
Isaac B. Owens.

INVENTORS
Louis Illmer Jr.
Edward J. Kunze
BY
ATTORNEYS

UNITED STATES PATENT OFFICE.

LOUIS ILLMER, JR., AND EDWARD J. KUNZE, OF NEW YORK, N. Y., ASSIGNORS OF FIVE-TENTHS TO SAID ILLMER, JR., FOUR-TENTHS TO SAID KUNZE, AND ONE-TENTH TO WALTER BOHRER.

VALVE MECHANISM.

No. 909,187.      Specification of Letters Patent.      Patented Jan. 12, 1909.

Application filed June 23, 1904, Serial No. 213,815. Renewed May 3, 1907. Serial No. 371,624.

*To all whom it may concern:*

Be it known that we, LOUIS ILLMER, Jr., and EDWARD J. KUNZE, both citizens of the United States, and residents of the city of New York, borough of the Bronx, in the county and State of New York, have invented a new and Improved Valve Mechanism, of which the following is a full, clear, and exact description.

The invention relates particularly to a valve mechanism for double acting two cycle internal combustion engine using a gaseous fuel, although it is useful to other machines, as will be apparent to persons skilled in the art and the present application is a continuation of the applications for patents on internal combustion engines filled by us on February 16, 1903, Serial Number 143,598, and February 4, 1904, Serial Number 191,968.

The subject of the present application embodies primarily a novel means for operating the inlet valves of an engine or other machine through the medium of a fluid under pressure, whereby the valve is moved to its various positions with absolute certainty, avoiding violent contact or knocks as well as idle movement of the valve.

Owing to the use of a fluid for operating the valve certain special features of structure and organization are necessary in the devices for mounting and packing the inlet valve, and the present invention also involves improvements in the form of the valve, its housing, and the means for packing the valve and piston rod.

Finally, the invention involves various other features of structure and organization, all of which will be fully set forth hereinafter and pointed out in the claims.

Reference is had to the accompanying drawings forming part of this specification, and illustrating as an example one of the various embodiments of our present invention, applied to an internal combustion engine in which drawings like letters of reference indicate like parts throughout the several views, and in which—

The general design of the engine, parts of which are shown in the drawings, may be taken to be the same as that of our co-pending application filed February 4, 1904, Serial Number 191,968, two inlet valves being provided one at each end of the cylinder, and each valve having its corresponding operating mechanism. The present drawings illustrate but one valve and its operating mechanism, since these parts are duplicated at each end of the engine.

10 indicates part of the cylinder head, 11 part of the water jacket, 12 part of the engine frame, 14 the inlet housing, 15 the inlet valve, and 16 the piston rod, all of which are essentially the same as in our last filed co-pending application.

The inlet valve 15 has a packing ring 17 extending around its tubular stem 18 and operating between two abutments in the housing 14, as will be hereinafter fully set forth. To the space between said abutments and the packing ring 17 two pipes 19 lead through the housing 14 to communicate the fluid pressure to the opposite sides of the packing ring or piston 17, thus imparting to the valve its characteristic movement. With these tubes 19 conduits 20 communicate, establishing connection between the tubes and the devices for controlling the operating fluid, which devices will now be described.

Figure 2:
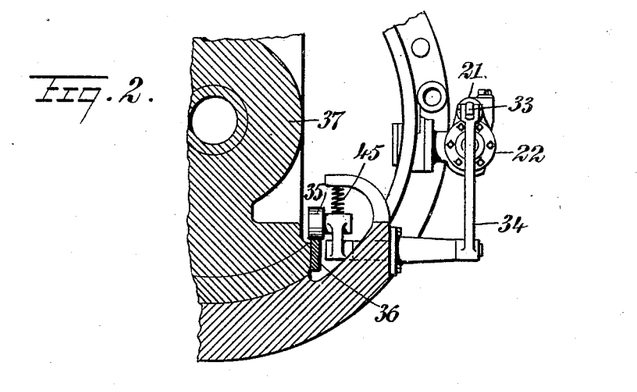
Fig. 2 is a fragmentary end elevation of the fluid pressure valve operating device, this view illustrating a fragment of the corresponding cross-head and a part of the engine frame and cross-head guide.

Attached to the engine frame at one side thereof are two horizontally alined pilot valve casings 21, and two horizontally alined displacer piston casings 22. As here shown the pilot valve casings 21 are respectively above the displacer piston casings 22, the corresponding pilot valve and displacer piston casing being cast integral. Air or other fluid under pressure is brought from a convenient or desired source through branch pipes 23, which lead respectively to supply ports 24 respectively in the pilot valve casings 21. The air after having performed its proper function, as will be hereinafter described, is returned to the casings 21 through ports 25, and passes into an exhaust pipe 26 connecting the contiguous ends of the casings 21 and having a suitable discharge 27. Establishing communication between the corresponding casings 21 and 22 are air ports 28, designed to lead the air pressure from the casings 21 into the displacer casings 22, as will be hereinafter fully set forth. Leading from the casings 22 are air exhaust ports 29, which, as best shown in Fig. 4, communicate with the before described ports 25 according to the arrangement here shown through the medium of a pressure reducing valve 30. Operating within the casings 21 are pilot valves 31, one for each casing, and which are designed when in one position to close communication between the ports 24 and 28 and open communication between the port 25 and the exhaust pipe 26 (see the left hand end of Fig. 3), and when in the other position to open communication between the ports 24 and 28 and close communication between the port 25 and the exhaust pipe 26 (see the right hand end of Fig. 3). These valves 31 are connected by a rod 32 to operate in unison, and the operating movement is imparted to them by a suitable gear operated from the adjacent cross-head of the engine. As here shown this gear comprises a rod 33 connected to the valves, having its outer end joined to one arm of an elbow lever 34 suitably mounted on the frame of the engine (see Fig. 2). The other arm of the elbow lever carries a roller 35 co-acting with a cam plate 36 attached to the cross-head 37.

Within each casing 22 a displacer piston 38 operates. These pistons are connected to move in unison by a rod 39 extending from one casing 22 to the other, and said pistons are actuated by the air pressure communicated through the ports 28 in a manner which will be hereinafter fully set forth. The pistons are formed with ports 40 which pass from points adjacent to the outer ends of the pistons to the inner faces thereof, and serve when in registry with the ports 28 to communicate the air pressure to the air sides $a$ of the displacer pistons within the casings 22. The opposite sides of the pistons are formed with cavities 41, and in the side walls of the pistons adjacent to the outer ends, ports 42 are formed. Leading from the casings 22 are ports 43 which communicate with the passages 44 leading to and communicating respectively with the pipes 20. The spaces $b$ in the casings 22 opposite the space $a$, the ports 43, passages 44, pipes 20 and 19, and the spaces surrounding the inlet valve stem 18 with which the pipes 19 communicate, are filled with a suitable fluid for transmitting from the displacer pistons 38 to the inlet valve 15, the movement characteristic of the valve; this fluid is preferably a liquid such as oil. It will be observed that as the displacer pistons 38 move from one position to the other, they cause the oil to flow out of one casing 22, actuating the inlet valve in the direction of this flow and into the other casing, and upon a reversal of the displacer piston movement a reversal of the oil flow and inlet valve movement will take place. Since the right-hand casing 22 communicates with the space at the outer side of the piston ring 17 on the inlet valve stem, and the left-hand casing 22 communicates with the inner side of this piston ring, the oil flowing from the right-hand casing 22 will serve to open the inlet valve and the oil flowing from the left-hand casing 22 will serve to close the same.

Figures 1, 6:
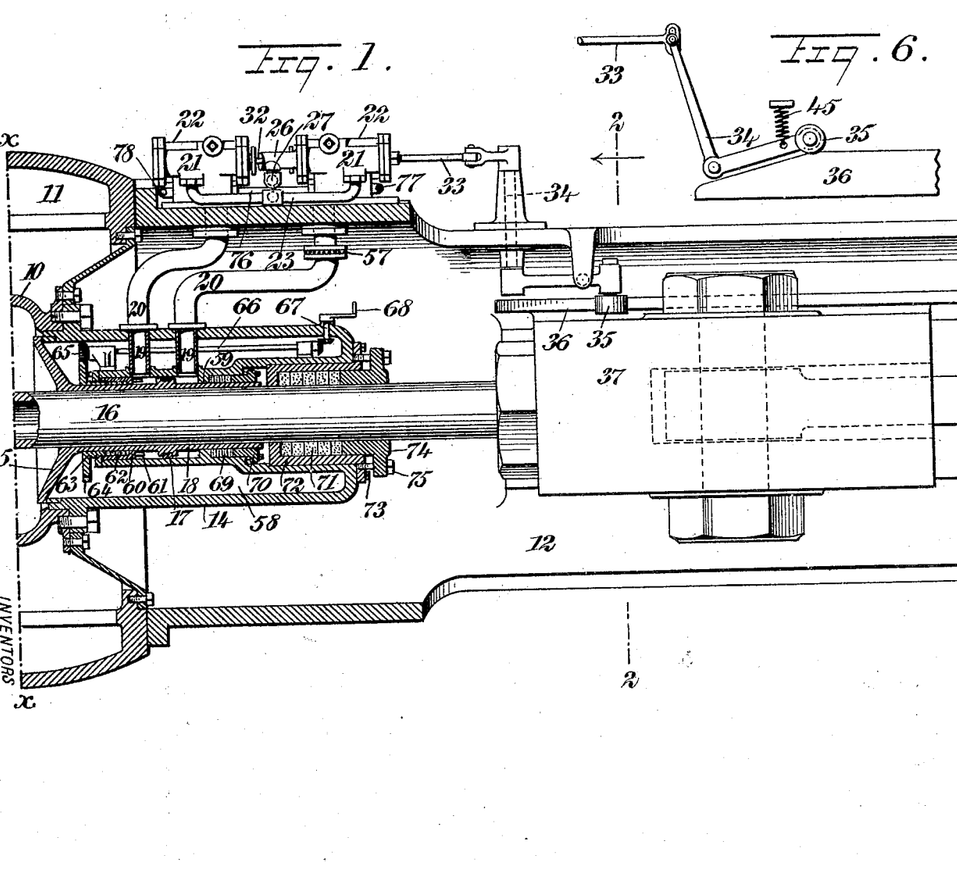
Figure 1 is a plan view of the fluid pressure valve operating mechanism at one end of the engine, showing the inlet valve, one end of the cylinder in the section.
Fig. 6 is a fragmentary side elevation of the pilot valve operating gear.
Figure 3:
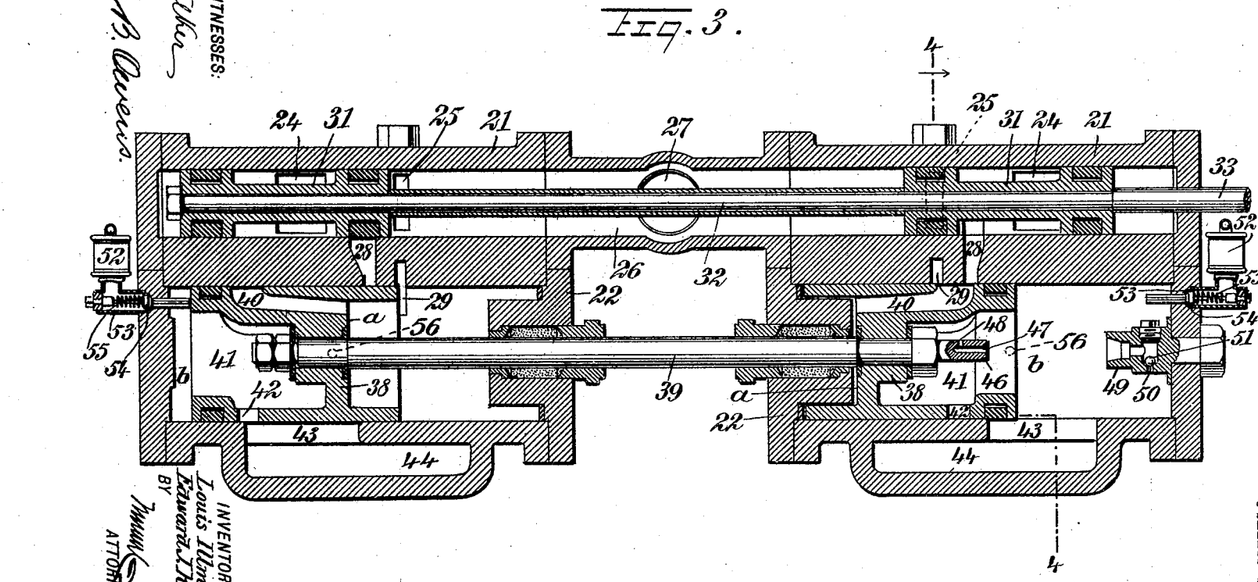
Fig. 3 is an enlarged vertical section taken on the line 3—3 of Fig. 4, through the pilot valve and displacer pistons, together with the immediately allied parts.
Figure 4:
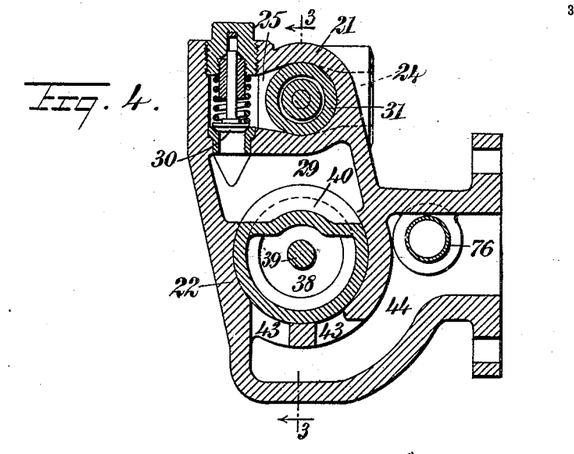
Fig. 4 is a cross section on essentially the line 4—4 of Fig. 3.

For the purpose of the following description let it be assumed that the parts are in the position shown in Figs. 1 and 3, in which the piston is nearing the end of its leftward stroke and the inlet valve is seated, the cam plate 36 having struck the lever 34 and thrown the pilot valves inward so as to uncover the air inlet port 28 in the right hand pilot valve casing, and to uncover the exhaust port 25 in the left hand pilot valve casing. As the right hand valve 31 uncovers the corresponding port 28 and establishes communication between said port and the corresponding port 24, the air pressure will be communicated through the port 40 to the air side of the right hand displacer piston 38, causing said piston to begin its rightward movement, and consequently to bring about a flow of oil from the corresponding oil space $b$, starting the opening action of the inlet valve. The air will act by impact on the displacer piston until the port 40 moves out of communication with the port 28, whereupon the air will be cut off, and the air then supplied to the air space $a$ will act expansively on the displacer piston, bringing it to the limit of its rightward movement, at which time the left-hand end of the right hand displacer piston uncovers the exhaust port 29, but it should be observed that the pressure will not be relieved until the valve 31 changes its position as will be hereinafter set forth. As the said valve 38 approaches the limit of its rightward movement its right-hand end will pass beyond the port 43, but the port 42 will still communicate with the port 43. It will be observed that since this port 42 is of relatively small dimensions, the passage for the oil from the space $b$ begins to be reduced in capacity, after the mid-stroke point and consequently a greater resistance will be offered to the escape of the oil. This serves to check the movement of the piston, and by this absorption of energy the piston is brought gradually to rest as contradistinguished from having its movement violently arrested. While these operations are going on with respect to the right hand displacer piston, the left hand displacer piston in following the former piston rightward is performing essential functions. As the left hand displacer piston moves rightward, the oil space $b$ thereof is enlarged to receive the in-flowing oil which is expelled from the inner side of the piston ring 17 on the valve stem 18 by the opening movement of the valve. Upon the rightward movement of the left hand displacer piston, the exhaust port 29 is covered and compression begins within the air space $a$ of the corresponding casing 22. This compression opposes an increasing resistance to the rightward movement of the two displacer pistons, and consequently an effective resistance to the opening force exerted on the inlet valve during the latter part of its stroke. As the compression increases the resistance increases, until at the end of the rightward movement of the displacer pistons the opening and closing forces are over-balanced to such an extent that the inlet valve is brought to rest when near the end position. When the left hand piston 38 has about reached the limit of its rightward movement its port 40 communicates with the exhaust port 29, and since the corresponding port 25 is in communication with the exhaust pipe 26 the pressure in the air space $a$ of the right hand casing 22 is exhausted, and the force opposing the opening movement of the valve is relieved. But it should be noted that although the right hand displacer piston has at this time uncovered its corresponding port 29, the corresponding valve 31 yet covers the corresponding port 25, and the pressure of the opening air is, therefore, held on the right hand displacer piston 38, holding this piston in its rightward position and holding the inlet valve open, this operation continuing until the pilot valves are shifted, as will be hereinafter set forth. When the engine piston reverses its movement and starts on its rightward stroke the cam plate 36 will slide from under the elbow lever 34, and a spring 45 or its equivalent will serve to throw down the elbow lever, moving rightward the pilot valves 31 and causing them to reverse their positions with respect to the groups of ports 24, 25, 28 and 29, and thereupon the opening air will be exerted on the left hand displacer piston, bringing about a leftward movement of these pistons and a consequent reversal of the above described operations, causing the inlet valve to be seated. This seating or closing movement of the inlet valve is attended by the same high initial movement and gradual final movement, terminating in a relaxation of the force opposing the closing pressure and in a continuation of the closing force until a further shifting of the pilot valves takes place.

Figure 5:
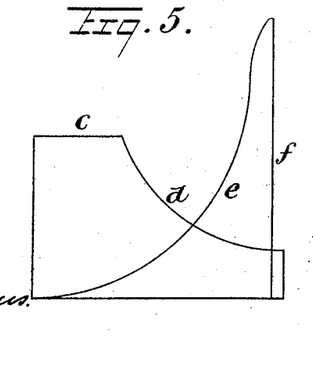
Fig. 5 is a diagram illustrating the distribution of pressures in the valve-operating devices.

By this mechanism we operate the inlet valves through the force of fluids under pressure, this operation being with absolute certainty both as to movement and time of movement, and we avoid abruptly arresting the stroke of the valve at the end of each stroke by applying a force which becomes effective during the latter half of the stroke, opposing the opening or closing force, as the case may be, and causing this opposing force to be exerted in such a way as to balance or more than balance the opening or closing force slightly before the end of the movement of the valve is reached, and then by relieving the opposing force we permit the opening or closing force to exert a continuing pressure, holding the valve in the position to which it is put until a reversal of the valve movement is desired. This action is well illustrated in the diagram in Fig. 5, where the line $c$ indicates, for example, the opening action under the impact of the compressed air or other fluid, and the curve $d$ the opening movement under the expansion of said air, while the curve $e$ represents the compression in the opposite displacer casing, this curve $e$ continuing until the compression is relieved, whereupon it drops as indicated by the line $f$, the curve $d$ passing beyond the line $f$, showing that the original opening pressure is continued on the displacer piston to hold the valve in its open position. The lines $c\,d$, therefore, represent the opening force, and the line $e$ the force opposing this opening movement, the adjustment being such that the opposing force over-balances the opening force during the latter part of the stroke, thus bringing the valve to rest, and then when the opposing force is relieved the opening force continues to hold the valve against idle movement.

The retaining valve 30 which is interposed between the ports 29 and 25 may or may not be employed as desired, or if desired, other means may be employed for performing its function, which is simply to prevent the pressure in the air space $a$ from dropping to atmospheric, holding a higher pressure in the air space and, therefore, upon compression, giving a higher mean pressure gradually resisting the opening or closing movement of the inlet valve.

We have before described the throttling of the oil discharge from the spaces $b$ by the relatively small ports 42, thus helping to bring the displacer pistons gradually to rest. As an additional means for this purpose, we may employ, as shown on the right hand displacer piston 38, a plunger 46, having a cavity 47 therein, from which a relatively slight discharge 48 leads laterally. A cup 49 is attached to the right hand end in the corresponding casing 22, this cup forming a dash pot in which the plunger 46 projects as the limit of the stroke is approached and after compression is relieved in the air space *a*. The only escape for the oil from the passage 47 will be through the small orifice 48, and it is clear that retarding influence will be exerted. In order to prevent this device from holding back the leftward movement of the displacer piston, we form a passage 50 leading laterally into the dash pot and commanded by an inwardly opening check valve 51 so that when the displacer piston starts leftward the valve 51 is unseated, and the oil flows freely through the cup.

As a means for replenishing the oil supply and for maintaining the displacer pistons in the proper adjustment to correct changes in position which may be due to leakage of the oil past the piston rings 17, we provide oil cups 52 and their appurtenant parts. These oil cups are adapted to contain oil with a suitable air pressure above it, and they communicate with passages 53 formed in the outer ends of the casings 22. Said passages are commanded by valves 54, the stems of which project into the casings 22 so that when the displacer pistons move excessively they will strike the stems and open the valves 54. Said valves are held yieldingly seated by springs 55. Let it be assumed that oil has leaked from the right hand space *b*. This will permit the right hand displacer piston to move excessively rightward, whereupon (the parts being properly adjusted) it will strike the stem of the right hand valve 54, opening said valve and allowing a certain quantity of oil to enter the oil space, thus restoring the proper quantity of oil. Should the above referred to leakage be past the piston ring 17 it follows that there is an excessive amount of oil in the left hand oil space *b*, and its connections. Then, upon the above referred to excessive rightward movement of the displacer pistons, the left hand displacer piston will uncover an outlet port 56, thus allowing the excessive oil to be discharged. It, therefore, follows, that the apparatus not only automatically restores leakage of the oil but automatically maintains the adjustment of the positions of the displacer pistons. The oil cups 52 are provided one for each displacer casing 22, and each casing is provided with the discharge port 56, the operation being the same for each movement.

We provide means for constantly throttling the flow of oil in one or both of the pipes 20 in order to adjust the maximum velocity acquired by the inlet valves. These means may be, if desired, an ordinary hand valve but we prefer to determine the degree to which the throttling should be carried according to the particular conditions of each engine, and provide a perforated plate 57 constructed according to the degree of throttling determined upon, and interpose this plate between two sections of the pipe 20, thereby preventing persons from tampering with the adjustment.

In order to prevent the oil for actuating the inlet valve from becoming unduly heated, we provide a means for cooling the same, consisting in a tube 76 (see Figs. 1 and 4) which extends through the passages 44 and is adapted to have a cooling fluid circulated through it. In Fig. 1, 77 may be taken to represent the inlet pipe and 78 the outlet pipe. By these means a continual circulation of water may be maintained, thus preventing the temperature of the oil from rising above the proper degree.

The valve housing 14 has a passage 58 through which the fuel mixture and scavenger air pass in successive strata, as is fully set forth in our co-pending applications above referred to. The inner wall of the valve housing has an abutment 59 between which and the piston ring 17, the opening oil acts, and a stuffing box 60 serves the same purpose with respect to the closing oil.

61 indicates a stop which limits the opening movement of the valve, this stop being projected from the stuffing box 60. The closing movement is limited by the engagement of the valve with its seat.

Within the stuffing box 60 a suitable packing 62 is located. This packing is kept in place by a gland 63, which is threaded within the stuffing box. The gland 63 has a peripherally toothed flange 64 engaged by a pinion 65, said pinion being carried on a shaft 66 revolubly mounted within the valve housing, and geared with a shaft 67 which passes outside of the same and is provided with a handle 68 facilitating the revolution of the two shafts. In this manner the position of the gland 63 may be regulated at will without removing the valve housing. If, however, it becomes necessary to remove the valve housing this may be done in the same manner as explained in our last filed copending application.

Leakage of the opening oil is prevented by packing 69 located at the outer side of the abutment 59, and held in place by a gland 70 fastened to the valve housing. The piston rod 16 is packed by a packing 71 held in a stuffing box 72, which is fastened by bolts 73 within the outer end of the valve housing.

74 indicates a gland for holding the packing 71 in place, this gland being joined by bolts 75 to the stuffing box.

It will be observed that the stuffing box 72 with the packing 71 and gland 74 may be readily removed from the housing 14, thus exposing the packing 69 and gland 70, enabling the same to be adjusted as may be desired, without in any way disturbing the valve housing. It, therefore, will be seen that all of the packing of the valve and piston rod may be adjusted from the outside of the housing without necessitating the dislocation of the same. It may be added that in practice the parts 60 and 63 are split to permit their proper engagement with the tubular stem 18 of the valve.

We desire it to be understood that various departures may be made from the specific embodiment of the invention here shown, without departing from the essentialities thereof.

Having thus described our invention, we claim as new and desire to secure by Letters Patent:—

1. The combination of a valve, means for exerting a force thereon to move the valve from one position to another, and means for exerting on the valve an increasing opposing force during the exertion of the first named force to bring the valve gradually to rest, and for relieving said opposing force prior to the termination of the first force to hold the valve in its new position.

2. The combination of a valve, means for exerting a fluid pressure thereon to move the valve from one position to another, and means for exerting on the valve an increasing opposing fluid pressure during the exertion of the first named pressure to bring the valve gradually to rest, and for relieving said opposing pressure prior to the termination of the first pressure to hold the valve in its new position.

3. In an engine the combination of a cylinder, walls forming a passage into the cylinder for the motive agent, an inlet valve commanding said passage for the motive agent, a valve stem, means for exerting on the valve stem a fluid pressure to move the valve from one position to another, and means for exerting on the valve stem an increasing opposing fluid pressure during the exertion of the first named pressure to bring the valve gradually to rest, and for relieving said opposing pressure prior to the termination of the first pressure to hold the valve in its new position.

4. The combination of a valve, means forming liquid receivers adapted to contain liquids in connection with the valve, fluid pressure operated displacers adapted alternately to displace said liquids to operate the valve in both directions and a second valve controlling the application of pressure to said displacers.

5. The combination of a valve, means forming a liquid receptacle adapted to contain a liquid in connection with the valve, a fluid pressure operated displacer acting on the liquid to operate the valve through the medium thereof and a second valve controlling the application of pressure to said displacers.

6. The combination of a valve, means for exerting a fluid pressure on the valve, to move it from one position to another, and means for opposing an elastic body to a part in connection with the valve, to increasingly compress said body and retard the said movement of the valve, and for relieving said compression prior to the termination of the exertion of the fluid pressure on the valve.

7. The combination of a valve, means for exerting fluid pressures thereon to operate it in both directions, said means including devices for opposing an elastic body to a part connected to the valve whereby to increasingly compress said elastic body and retard the movement of the valve, and means for relieving said compression prior to the termination of the said fluid pressure actuating the valve.

8. The combination of a valve, means forming two receivers adapted to contain liquid bodies in connection with the valve, displacers for alternately displacing said liquid bodies to operate the valve in both directions, and means for applying an elastic fluid under pressure to the displacers to operate the same, said elements including devices for forming an elastic fluid cushion retarding the displacer movements.

9. The combination of a valve, means forming two receivers adapted to contain liquid bodies in connection with the valve, displacers for alternately displacing said liquid bodies to operate the valve in both directions, and means for applying an elastic fluid under pressure to the displacers to operate the same, said elements including devices for forming an elastic fluid cushion resisting the displacer movements, and for relieving said cushion prior to the termination of the operating pressure on the valve.

10. The combination of a valve, means forming a fluid passage or receiver adapted to hold a fluid body in connection with the valve, a displacer casing communicating with said passage, a displacer piston within the casing, the communication between the casing and passage being at one side of said piston, and means for exerting a fluid pressure on the other side of said displacer piston.

11. The combination of a valve, means forming a fluid passage or receiver adapted to hold a fluid in connection with the valve, a displacer casing with which the passage communicates, a displacer piston within the casing, the communication between the casing and passage being at one side of the displacer piston, a pilot valve casing communicating with the displacer casing at the other side of said piston, means for supplying a fluid pressure to the pilot valve casing, and a pilot valve within the casing and controlling the application of said pressure to the displacer piston.

12. The combination of a valve, means forming two fluid receivers or passages adapted to hold fluid bodies in connection with the valve, whereby the valve may be operated in both directions through the medium of said fluid bodies, displacer casings respectively in communication with said fluid passages, connected displacer pistons in the casings, the communication between the passages and casings being at one side of the respective pistons, and means for alternately applying an elastic fluid under pressure to the remaining sides of the displacer pistons, said elements having ports arranged to hold part of said elastic fluid in one displacer casing, while the displacer piston of the other casing is being actuated whereby to cause compression in the first casing and oppose a resistance to the movement of the displacer pistons.

13. The combination of a valve, means forming two fluid receivers or passages adapted to hold fluid bodies in connection with the valve, whereby the valve may be operated in both directions through the medium of said fluid bodies, displacer casings respectively in communication with said fluid passages, connected displacer pistons in the casings, the communication between the passages and casings being at one side of the respective pistons, and means for alternately applying an elastic fluid under pressure to the remaining sides of the displacer pistons, said elements having ports arranged to hold part of said elastic fluid in one displacer casing, while the displacer piston of the other casing is being actuated, whereby to cause compression in the first casing and oppose a resistance to the movement of the displacer pistons, and for relieving said compression in the first displacer casing prior to the termination of the fluid pressure in the second displacer casing.

14. The combination of a valve, means forming a liquid receiver adapted to hold a liquid in connection with the valve, a liquid in said receiver, and fluid pressure actuated means including a second or pilot valve for displacing the liquid to operate the valve.

15. The combination of a valve, means forming an oil receiver adapted to hold an oil in connection with the valve, a body of oil in said receiver, and fluid pressure actuated means including a second or pilot valve for displacing the oil to operate the valve.

16. The combination of a valve, means forming a liquid receiver adapted to hold a liquid in connection with the valve, a body of liquid in said receiver, a displacer piston engaged at one side with the liquid, and means including a second or pilot valve for exerting a fluid pressure on the other side of the displacer piston.

17. The combination of a valve, means forming an oil receiver adapted to hold an oil in connection with the valve, a body of oil in said receiver, a displacer piston bearing at one side on the oil, and means including a second or pilot valve for exerting a fluid pressure on the other side of the piston.

18. The combination of a valve, a displacer casing, means forming a fluid reservoir or passage communicating with the displacer casing and adapted to hold a fluid body in connection with the valve, a displacer piston mounted in the displacer casing and adapted to engage one side with said fluid body, the displacer piston having a fluid pressure port leading to the other side of the piston, a pilot valve casing having a fluid inlet port, a port leading into the displacer casing and adapted to communicate with the port in the displacer piston, and ports forming an exhaust passage leading from the displacer casing to the pilot valve casing, and a pilot valve mounted in the latter casing and movable to connect the fluid pressure inlet port and the port leading from the pilot valve casing to the displacer casing or to disconnect said ports and uncover the exhaust port.

19. The combination of a valve, means forming a fluid receiver or passage adapted to hold a fluid in connection with the valve, a displacer casing having a port establishing communication with said receiver or passage, a displacer piston operating in the displacer casing and adapted in one position to cover the said port thereof, and the piston having a relatively small port therein adapted to communicate with the port in the displacer casing when said port of the casing is covered by the displacer piston, and means for operating the displacer piston.

20. The combination of a valve, fluid pressure devices for actuating the same, said devices including a displacer casing and piston, and a cup and plunger respectively on said parts adapted to co-act upon the end of the piston movement to retard the same, and means for operating the displacer piston.

21. The combination of a valve, fluid pressure devices for actuating the same, said devices including a displacer casing and piston, and a cup and plunger respectively on said parts adapted to co-act upon the end of the piston movement to retard the same, and means for operating the displacer piston, the said cup having an opening therein and inwardly opening valve commanding the opening to facilitate the unrestrained withdrawal of the plunger from the cup.

22. The combination of a valve, fluid pressure devices for actuating the same, said devices including a displacer casing and piston, and a cup and plunger respectively on said parts adapted to co-act upon the end of the piston movement to retard the same, means for operating the displacer piston, and the plunger having a passage from the outer end to the side thereof for the purpose specified.

23. The combination of a valve, means constituting a fluid receiver or passage adapted to hold a fluid in connection with the valve, a displacer casing communicating with said passage, a displacer piston movable in the passage, means for operating the piston, and means for automatically replenishing the fluid supply upon excessive movement of the piston, said means comprising a fluid holder outside of the displacer casing and communicating with the interior thereof, and a valve normally closing said communication and having a part projected into the casing to be struck by the displacer piston.

24. The combination of a valve, means constituting a fluid receiver or passage adapted to hold a fluid in connection with the valve, a displacer casing in connection with the said passage, a displacer piston mounted in the casing, means for operating the displacer piston, and means for automatically replenishing the fluid supply upon the excessive movement of the piston in one direction, and for automatically diminishing the fluid supply upon excessive movement of the piston in the other direction, said means comprising an oil holder outside of the casing and communicating therewith, a valve normally closing said communication and having a part projected into the casing to be struck by the piston at one end of its stroke and an outlet port in the casing in position to be uncovered by the piston at the other end of its stroke.

25. The combination of a valve, means forming two fluid receivers or passages adapted to hold fluid bodies in connection with the valve, whereby the valve may be operated in both directions through the medium of said fluid bodies, displacer casings respectively in communication with said fluid passages, connected displacer pistons in the casings, the communication between the passages and casings begin at one side of the respective pistons, and means for alternately applying an elastic fluid under pressure to the remaining sides of the displacer pistons, said elements having ports arranged to hold part of said elastic fluid in one displacer casing, while the displacer piston of the other casing is being actuated whereby to cause compression in the first casing and oppose a resistance to the movement of the displacer pistons, and for relieving said compression in the first casing prior to the termination of the pressure of the elastic fluid in the other or second casing.

26. In an engine the combination of a cylinder, piston and piston rod, an inlet valve surrounding the piston rod, valve housing also surrounding the piston rod, a tubular valve stem movable within the housing, a packing acting between the stem and housing, and means in connection with the packing and extending to the outside of the housing to adjust the packing without removing the housing.

27. In an engine the combination of a valve, a valve housing, a packing inclosed within the housing and acting between the valve and housing, and means in connection with the packing and extending to the outside of the housing to adjust the packing without removing the housing.

28. In an engine the combination of a valve, a valve housing, a packing operating between the valve and housing and comprising a stuffing box and gland having threaded connection, a gear on the gland, a gear in connection with the first named gear, and means extending to the outside of the housing for operating the second named gear.

29. In an engine the combination with a cylinder, piston and rod of a valve and tubular stem encircling the rod, a housing inclosing the stem and encircling the rod, a packing acting between the inner end of the housing and a tubular stem, means in connection with the packing and extending to the outside of the housing to facilitate the adjusting of the packing, a second packing acting between the housing and the outer end of the tubular stem, and a third packing acting between the rod and the housing outward from the second packing and removable from the housing to expose the second packing.

30. In an engine the combination with a cylinder, piston and rod of a valve encircling the rod, a valve housing, a packing acting between the valve and the housing, and a packing acting between the rod and housing and removable from the housing to expose the first named packing.

31. The combination of a valve, means forming two receivers adapted to contain liquid bodies in connection with the valve, displacers for alternately displacing said liquid bodies to operate the valve in both directions, and means for applying an elastic fluid under pressure to the displacers to operate the same, said elements including devices for forming an elastic fluid cushion resisting the displacer movements.

32. The combination of a valve, means forming two receivers adapted to contain liquid bodies in connection with the valve, displacers for alternately displacing said liquid bodies to operate the valve in both directions, and means for applying an elastic fluid under pressure to the displacers to operate the same, said elements including devices for forming an elastic fluid cushion resisting the displacer movements, and for relieving said cushion approximately when the valve has been brought to rest.

33. The combination of a valve, means forming two fluid receivers or passages adapted to hold fluid bodies in connection with the valve, whereby the valve may be operated in both directions through the medium of said fluid bodies, displacer casings respectively in communication with said fluid passages, connected displacer pistons in the casings, the communication between the passages and casings being at one side of the respective pistons, and means for alternately applying an elastic fluid under pressure to the remaining sides of the displacer pistons, said elements having ports arranged to hold part of said elastic fluid in one displacer casing, while the displacer piston of the other casing is being actuated, whereby to cause compression in the first casing and oppose a resistance to the movement of the displacer pistons, and for relieving said compression in the first displacer casing approximately when the valve has been brought to rest.

34. The combination of a valve, means for exerting fluid pressure on the valve to move it from one position to another, and means for opposing an elastic body to a part in connection with the valve to increasingly compress said body and retard said movement of the valve, and for relieving said cushion approximately when the valve has been brought to rest.

35. The combination of a valve, means forming a liquid receiver adapted to hold a liquid in connection with the valve, a liquid body in said receiver, and means for displacing said liquid body to operate the valve, and means for throttling or obstructing the liquid movement during the latter part of the valve movement.

36. The combination of a valve, means forming a liquid receiver adapted to hold a liquid in connection with the valve, a liquid body in said receiver, and means for displacing said liquid body to operate the valve, and means for increasingly throttling or obstructing the liquid movement during the latter part of the valve movement.

37. The combination of a valve, means for exerting a fluid pressure on the valve to move it from one position to another, means for opposing an elastic fluid to a part in connection with the valve to compress said fluid and retard the said movement of the valve, and an exhausting means to exhaust the fluid, said exhausting means including a pressure retaining device.

38. The combination of a valve, means for exerting a force thereon to move the valve from one position to the other, and means for exerting on the valve an increasing opposing force during the exertion of the first named force to bring the valve gradually to rest and for relieving the said opposing force near the time when the valve has been brought to rest.

39. The combination of a valve, means for exerting a fluid pressure thereon to move the valve from one position to the other, and means for exerting on the valve an increasing opposing fluid pressure during the exertion of the first named fluid pressure to bring the valve gradually to rest, and for relieving said opposing fluid pressure near the time when the valve has been brought to rest.

40. In an engine, the combination of a cylinder, walls forming a passage into the cylinder for the motive agent, an inlet valve commanding said passage for the motive agent, means for exerting on the valve a fluid pressure to move the valve from one position to the other, and means for exerting on the valve an increasing opposing fluid pressure during the exertion of the first named fluid pressure to bring the valve gradually to rest, and for relieving said opposing fluid pressure prior to the termination of the first pressure to hold the valve in its new position.

41. In an engine, the combination of a cylinder, walls forming a passage into the cylinder for the motive agent, an inlet valve commanding said passage for the motive agent, means for exerting on the valve a fluid pressure to move the valve from one position to the other, means for exerting on the valve an increasing opposing fluid pressure during the exertion of the first named pressure to bring the valve gradually to rest, and means for relieving said opposing pressure near the time when the valve has been brought to rest.

42. The combination of a valve, means for exerting a fluid pressure on the valve to move it from one position to the other, means for opposing an elastic body to a part in connection with the valve, to increasingly compress said body and retard said movement of the valve, and for relieving said compression near the time when the valve has been brought to rest.

43. The combination of a valve, means for exerting a fluid pressure on the valve to move it from one position to the other, and means for opposing an elastic body to the movement of the valve to increasingly compress said body and retard said movement of the valve, and for relieving the compression of said elastic body near the time when the valve has been brought to rest.

44. The combination of a valve, and means for exerting a fluid pressure thereon to operate it in both directions, said means including devices for opposing an elastic body to the movement of the valve, whereby to increasingly compress said body and retard the movement of the valve, and for relieving said compression of the elastic body near the time when the valve has been brought to rest.

45. The combination of a valve, means forming two receivers adapted to contain a liquid body in connection with the valve, displacers for alternately displacing the liquid bodies to operate the valve in both directions, and means for applying an elastic fluid under pressure to the displacers to operate the same, said elements including devices for forming an elastic fluid cushion resisting the displacer movement and for relieving said cushion near the time when the valve has been brought to rest.

46. The combination of a valve, means forming two fluid receivers or passages adapted to hold fluid bodies in connection with the valve, whereby the valve may be operated in both directions through the medium of said fluid bodies, displacer casings in connection with said fluid passages, connected displacer pistons in the casings, the communication between the passages and casings being at one side of the respective pistons, and means for alternately applying an elastic fluid under pressure to the remaining sides of the displacer pistons, the said elements having ports arranged to hold said elastic fluid in one displacer casing while the displacer piston of the other casing is being actuated whereby to cause compression in the first casing, and cause resistance to the movement of the displacer pistons, and for relieving the compression in the first displacer casing near the time when the valve has been brought to rest.

47. The combination of a valve, means forming two fluid receivers or passages adapted to hold fluid bodies in connection with the valve, whereby the valve may be operated in both directions through the medium of said fluid bodies, displacer casings respectively in connection with said fluid passages, connected displacer pistons in the casings, the communication between the passages and casings being at one side of the respective pistons, and means for alternately applying an elastic fluid under pressure to the remaining sides of the displacer pistons, said elements having ports arranged to hold parts of said elastic fluid in one displacer casing while the displacer piston of the other casing is being actuated, whereby to cause compression in the first casing and oppose a resistance to the movement of the displacer pistons, and for relieving said compression near the time when the valve has been brought to rest.

48. In an engine, the combination of a cylinder, walls forming a passage into the cylinder for the motive agent, an inlet valve commanding said passage for the motive agent, means for exerting on the valve a fluid pressure to move the valve from one position to the other, means for exerting on the valve a gradually increasing opposing fluid pressure during the exertion of the first named pressure to bring the valve gradually to rest, and means for relieving said opposing pressure prior to the termination of the first pressure to hold the valve in its new position.

49. The combination of a valve, a fluid pressure actuated means for operating the same, said means including a cylinder and piston, and a cup and plunger respectively in said parts adapted to coact upon the end of the piston movement to retard the same.

50. The combination of a valve, a fluid pressure actuated means for operating the same, said means including a cylinder and piston, a cup and plunger respectively in said parts adapted to coact upon the end of the piston movement to retard the same, said cup having an opening therein, and a valve commanding the opening and unseating to admit fluid movement into the cup for the purpose specified.

51. The combination of a valve, a fluid pressure actuated means for operating the same, said means including a cylinder and piston, and a cup and plunger respectively in said parts adapted to coact upon the end of the piston movement to retard the same, the said plunger having a passage from the outer end to one side thereof for the purpose specified.

52. The combination of a valve, means for exerting a force thereon to move the valve from one position to another, and means exerting on the valve a force opposing the first named force to bring the valve gradually to rest and for abruptly or instantly relieving the opposing force near the time when the valve has been brought to rest.

53. The combination of a valve, means for exerting a fluid pressure thereon to move the valve from one position to another, and means for exerting on the valve an opposing fluid pressure during the exertion of the first named fluid pressure to bring the valve gradually to rest, and for abruptly or instantly relieving the opposing fluid pressure near the time when the valve has been brought to rest.

54. The combination of a valve, means for exerting an elastic fluid pressure thereon to move the valve from one position to another, means for exerting on the valve elastic fluid pressure opposing the first named pressure to bring the valve gradually to rest and for abruptly or instantly relieving the opposing pressure near the time when the valve has been brought to rest.

55. The combination of a valve, means for exerting a fluid pressure thereon, to move the valve from one position to another, and means for exerting on the valve an opposing fluid pressure during the exertion of the first named fluid pressure to bring the valve gradually to rest, said means including relatively moving ported parts for relieving the opposing fluid pressure near the time when the valve has been brought to rest.

56. The combination of a valve, means for exerting elastic fluid pressure thereon to move the valve from one position to the other, and means for exerting on the valve an opposing elastic fluid pressure during the exertion of the first named pressure to bring the valve gradually to rest, said means including relatively moving ported parts for relieving the said opposing fluid pressure near the time when the valve has been brought to rest.

57. The combination of a valve, means for exerting a fluid pressure thereon to move the valve from one position to another, and means for exerting on the valve an opposing fluid pressure during the exertion of the first named pressure to bring the valve gradually to rest, said means including a ported casing and a piston moving therein and having a port extending from one end to its side and coacting with the port of the casing, for relieving said opposing pressure near the time when the valve has been brought to rest.

58. The combination of a valve, means forming a liquid receiver adapted to hold a liquid in connection with the valve, a displacer casing with one part of which said receiver communicates, a displacer piston in said receiver, and means for admitting fluid pressure to act on the displacer piston at the side opposite that communicating with said liquid receiver.

59. The combination of a valve, a part in connection therewith and adapted to have fluid pressure exerted thereon to operate the valve back and forth, means forming two pressure receivers to conduct the fluid to opposite sides of said part, two casings with which said means including a second or pilot valve respectively communicate, a displacer piston in each casing, each piston being arranged to have one face work against said fluid, a connection between the displacer pistons, and means for admitting fluid pressure to the casings to act alternately on the remaining faces of the displacer pistons.

60. The combination of a valve, means for exerting a decreasing force thereon to move the valve from one position to another, and means for exerting on the valve an increasing opposing force during the exertion of the first named force to bring the valve gradually to rest and for relieving said opposing force prior to the termination of the first force to hold the valve in its new position.

61. The combination of a valve, means for exerting a decreasing fluid pressure thereon to move the valve from one position to another, and means for exerting on the valve an increasing opposing fluid pressure during the exertion of the first named fluid pressure to bring the valve gradually to rest and for relieving said opposing fluid pressure prior to the termination of the first fluid pressure to hold the valve in its new position.

62. The combination of a valve, means for exerting a fluid pressure on the valve to move the valve from one position to another, and means for exerting on the valve an increasing opposing fluid pressure during the exertion of the first named pressure to bring the valve gradually to rest, and for relieving said opposing pressure prior to the termination of the first named pressure to hold the valve in its new position, said means including a casing having supply and exhaust ports, a pilot valve movable alternately to cover and uncover the ports, and a piston one end of which is movable past the exhaust port to uncover the same, said piston having therein a port passing from said end to the side and capable of registry at the side with both of the casing ports.

In testimony whereof we have signed our names to this specification in the presence of two subscribing witnesses.

LOUIS ILLMER, Jr.
EDWARD J. KUNZE.

Witnesses:
SQUIRE B. ROLFE,
ANNA L. DRAKE.